United States Patent [19]

Saunders et al.

[11] 3,874,818

[45] Apr. 1, 1975

[54] BIFILAR VIBRATION DAMPERS

[75] Inventors: James Edwin Saunders, Bradford Abbas near Sherborne; Alan Henry Vincent, East Coker near Yeovil, both of England

[73] Assignee: Westland Aircraft Limited, Yeovil, Somerset, England

[22] Filed: Oct. 1, 1973

[21] Appl. No.: 402,140

[30] Foreign Application Priority Data
Oct. 19, 1972 United Kingdom............ 48178/72

[52] U.S. Cl.................. 416/144, 416/500, 74/574
[51] Int. Cl............................................ B64c 27/32
[58] Field of Search........ 416/144, 145, 500; 74/574

[56] References Cited
UNITED STATES PATENTS

| | | | |
|---|---|---|---|
| 2,353,681 | 7/1944 | Martin et al.................. | 416/500 X |
| 3,372,758 | 3/1968 | Jenney........................... | 416/500 X |
| 3,540,809 | 11/1970 | Paul et al....................... | 416/144 X |

Primary Examiner—Everette A. Powell, Jr.
Attorney, Agent, or Firm—Larson, Taylor & Hinds

[57] ABSTRACT

In bifilar vibration dampers adapted for cancelling vibrations in helicopter rotor systems a mass is connected by two pins to a support so that the mass is capable of pendulous movements relative the support. The pins are located in opposed arcuate slots in the mass and the support, so that the washers for the pin have only to be of slightly larger diameter than the width of the slots in order to retain the pins, thereby minimising inertia effects to significantly increase the operational efficiency of the damper.

9 Claims, 3 Drawing Figures

PATENTED APR 1 1975  3,874,818

BIFILAR VIBRATION DAMPERS

This invention relates to bifilar vibration dampers, and particularly to such dampers adapted for cancelling vibrations in a helicopter rotor system.

By a bifilar vibration damper we mean a damper having a mass which is connected to a support by two pins to that, during operation, the mass moves in a pendulous movement with respect to the support. When the pendulum natural frequency is equal to an external exciting frequency the pendulum exerts a force on the support which is equal and opposite to the force applied by the external excitation so that vibration is either reduced or eliminated.

One of the parts, usually the mass in existing designs, is of U-shaped cross-section and is arranged to receive the other part, i.e. the support, between its parallel side portions. The pendulous movements of the mass are permitted by rolling of the two pins along the surfaces of circular apertures in both of the arms of the U-shaped mass and in the support. Two large washers are clamped on each pin and located between the inner surfaces of the side portions of the U-shaped mass and the adjacent surfaces of the support to retain the pins in their operative positions.

When adapted for use in a helicopter rotor system, at least three bifilar vibration dampers are arranged symmetrically about the rotational axis of the main rotor system at the ends of supports in the form of arms extending radially from a rotor hub. The dampers rotate with the rotor system in a plane perpendicular to the axis of rotation, and can be located either above, below, or coincident with the plane of rotation of the main rotor blades. The dampers can be adapted and tuned to cancel either in-plane or rotor moment and shear forces active on the rotor head at any particular frequency.

According to the invention we provide a bifilar vibration damper having a mass connected by two pins to a support so that the mass is capable of pendulous movements relative the support, either the mass or the support being of U-shaped cross-section and arranged to receive the other part between its parallel side portions, wherein the pins are located and retained in opposed arcuate slots in the mass and the support, so as to permit pendulous movements of the mass relative the support by rolling of the pins through the length of the arcuate slots.

The invention will now be described by way of example only and with reference to the accompanying drawings, in which.

Figure 1:
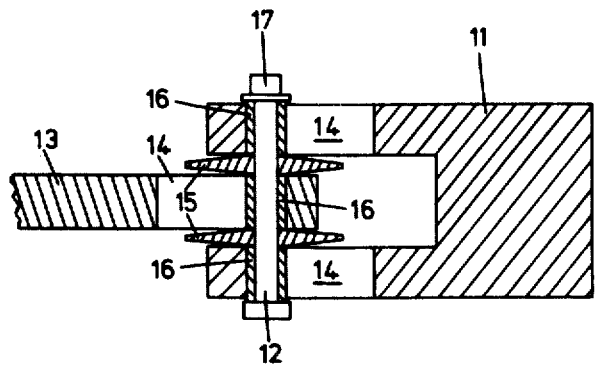
FIG. 1 is a sectioned side view of an existing bifilar damper construction.

An existing bifilar damper construction is shown in FIG. 1, and comprises a mass in the form of a U-shaped weight 11 connected by two pins 12 at an end of a supporting arm 13. One only of the pins 12 is hown in the drawing, and it is to be understood that the assembly of parts is identical at each pin location.

The pins 12 are located in circular apertures 14 in both of the parallel side portions of the weight 11 and in the support 13 to permit pendulous movement of the weight 11 relative the support 13 by rolling of the pins 12 over the surfaces of the apertures 14. The pins 12 are retained by cylindrical washers 15 located between the surfaces of the parallel side portions of the weight 11 and the surfaces of the support 13, the washers 15 being located and clamped by annular spacer members 16 retained by nuts 17.

It will be apparent in relation to the typical existing bifilar damper shown in FIG. 1 that the outside diameter of the washers 15 must always be greater than the diameter of the apertures 14 in order to retain the pins 12 in their correct operative position. The arrangement means, therefore, that the washers have a relatively large inertia which is detrimental to the operational efficiency of existing bifilar dampers as is more fully explained hereinafter.

The improved bifilar vibration damper shown in FIGS. 2 and 3 again includes a mass in the form of a U-shaped weight 11 connected by two pins 12 at an end of a supporting arm 13. In this arrangement, the pins are located in opposed arcuate slots 18 and 19 provided respectively in both of the side portions of the weight 11 and in the support 13 to permit the required pendulous movement of the weight 11 relative the support 13. The pins 12 are similarly retained by cylindrical washers 15 located by annular spacer members 16 (FIG. 3) forming the rolling surfaces and retained by nuts 17; however, in this arrangement it will be apparent that the outside diameter of the washers 15 is greatly reduced over that of existing designs (FIG. 1). This reduction is possible because in the assembly according to the present invention the pins 12 have only be retained in a space represented by the width of the slots 18 and 19 as opposed to a space represented by the diameter of the apertures 14 in existing designs (FIG. 1). This means that in the improved design the diameter of the washer 15 has only to be slightly larger than the width of the slots 18 and 19, thereby significantly reducing the inertia of the washers 15 during rolling of the pins 12, resulting in improved operational efficiency.

Figure 2:
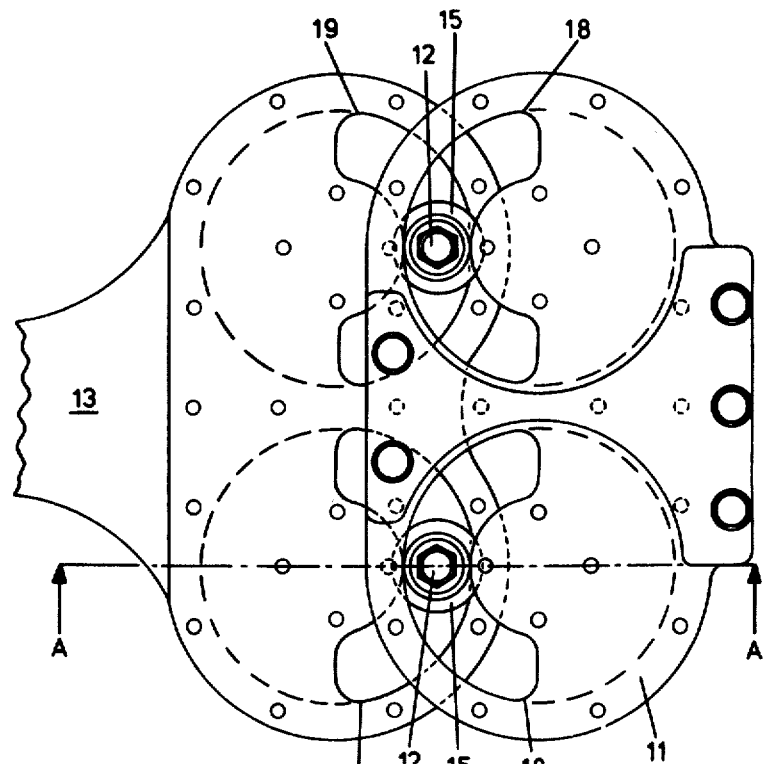
FIG. 2 is a plan view of an improved bifilar damper according to one embodiment of the present invention.
Figure 3:
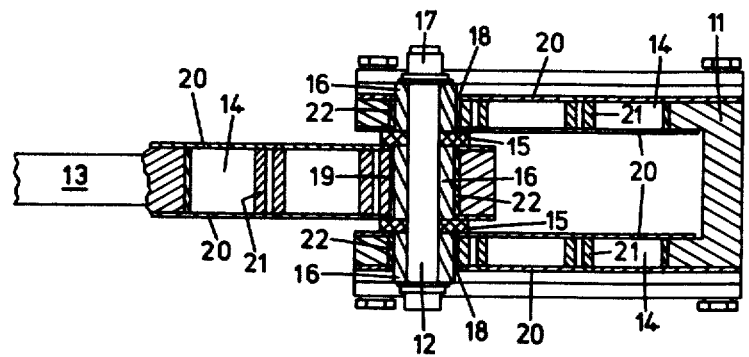
FIG. 3 is a sectioned view on lines A—A of FIG. 2.

In the particular embodiment of the present invention shown in FIGS. 2 and 3, the arcuate slots 18 and 19 extend through an arc of approximately 180°, and are formed in plate members 20 rivetted to the surfaces of the side portions of the weight 11 and to the surfaces of the support 13 over circular apertures 14 provided in the weight 11 and the support 13. The plates 20 are supported centrally by annular spacer members 21 rivetted between the plates. This construction has the advantage that it facilitates the fitment of annular liners 22 in the apertures 14 to provide the rolling surfaces, and means for instance that a rolling surface of high grade steel can be provided in a weight 11 and support 13 of a lower grade material. To ensure that the annular spacer members 16 roll along the surface of the liners 22 and not on the edges of the arcuate slots 18 and 19 in the plates 20, the outer radius of the tracks 18 and 19 is of slightly greater dimension than the internal radius of the liners, as shown in FIG. 3.

However, it is to be understood that this particular construction is exemplary only, and that many modifications are possible. For instance, the arcuate slots 18 and 19 could be machined in the weight 11 and the support 13, so that the surfaces of the tracks provide the rolling surfaces, thereby dispensing with the liners 22, the spacers 21, and the plates 20.

in operation, a bifilar damper is tuned to cancel out of balance forces of a particular frequency.

In the case of existing bifilar dmpers as shown in FIG. 1, rotation of the pins 12 during pendulous movements of the weight 11 also causes rotation of the relatively large washers 15, thereby creating a high inertia in the washers 15, resulting in a reduction in operational frequency leading to detuning of the damper. Such detuning will have an adverse effect on the operational capabilities, and may well be of sufficient magnitude to render existing constructions ineffective.

The present invention provides a bifilar vibration damper in which the outside diameter, and therefore the inertia, of the washers 15 is greatly reduced over existing arrangements, thereby minimising inertia effects of the washers 15 caused by rolling movements of the pins 12 to significantly increase the operational efficiency of the damper. The reduction in outside diameter of the washers 15 is accomplished in a bifilar damper according to the present invention because of the arrangement in which the pins 12 are restrained to move in arcuate slots 18 and 19 in the weight 11 and the support 13. This means that the washers 15 have a diameter only slightly larger than the rolling surfaces of the annular spacer members on the pins 12, as opposed to a diameter which must be larger than the diameter of the apertures 14 in existing designs.

In one application, at least three of our improved bifilar vibration dampers are arranged symmetrically about the rotational axis of a helicopter main rotor system, each damper being supported at the end of an arm extending radially from a main rotor hub. The dampers rotate in a plane perpendicular to the axis of rotation, or parallel to the plane of rotation of the rotors, and are oriented and tuned to cancel in-plane vibration forces acting on the rotor head. In other installations the dampers could be rotated through 90° and tuned to cancel rotor moment and/or shear forces effective on the particular helicopter rotor system in which they are installed.

Although one embodiment of the improved bifilar vibration damper has been described and illustrated, it is to be understood that many modifications are possible without departing from the scope of the appended claims, some of which have been previously detailed in this specification. The parts of the assembly could be reversed, so that the support comprises a U-shaped member and the mass comprises a weight located between the two arms of the support.

We claim as our invention:

1. A bifilar vibration damper indlucing in combination: a support arm adapted to extend radially from and to be rotated in a plane about an axis of rotation and having two arcuate slots extending therethrough, the slots being concentric about parallel axes which are parellel to and equidistant from the axis of rotation and located with their concave surfaces closest the axis of rotation, a pendulous member of U-shaped cross section having substantially parallel side plate members positioned on opposite sides of said support member and spaced therefrom so as to define a spacing distance from said support member when said pendulous member is centered laterally with respect to the support member, each side plate member having two arcuate slots extending therethrough, the slots being concentric about parallel axes which are substantially parallel to the axis of rotation and being of substantially the same dimensions as the support member slots, the slots in each side plate member being sligned respectively with the slots of the other side plate member and located with their convex surfaces closest the axis of rotation, a pin member extending through each of the slots of the support member and the aligned slots of the side plate members to connect the pendulous member to the support member, the pin member being of substantially circular cross section and concentric about a straight line axis and having a diameter less than the width of the slots, an annular washer positioned between the support member and each of the side plate members and connected at its inner diameter to the pin member and having an outer diameter greater than the width of the slots in the support and side plate members.

2. A damper as claimed in claim 1, the said washers having an outer diameter slightly greater than the width of the arcuate slots.

3. A damper as claimed in claim 2, wherein the washers are fixed longitudinally on the pins by annular spacer membeers clamped by a nut, the outer surface of the spacer members forming the rolling surfaces of the pins in the slots.

4. A damper as claimed in claim 1, wherein a liner is located on the concave surface of each slot.

5. A damper as claimed in claim 4, wherein the liners are of a different material than the support arm and pendulous member.

6. A damper as claimed in claim 1, wherein the support arm and pendulous member are supported centrally of the slots by spacer members secured within the apertures.

7. A damper as claimed in claim 1, wherein the opposed arcuate slots are machined through the side portions of the support arm and pendulous member.

8. A damper as claimed in claim 1, wherein the arcuate slots extend through an arc of approximately 180°.

9. At least three bifilar vibration dampers as claimed in claim 1, the said axis of rotation being the axis of rotation of a helicopter main rotor system, each bifilar being secured at the end of an arm extending radially from a rotor hub for rotation with the rotor system in a plane perpendicular to the axis of rotation.

\* \* \* \* \*